Sept. 29, 1953 J. S. MARTIN ET AL 2,653,487
ADJUSTABLE SPEED MECHANISM
Filed Oct. 2, 1950 2 Sheets-Sheet 1
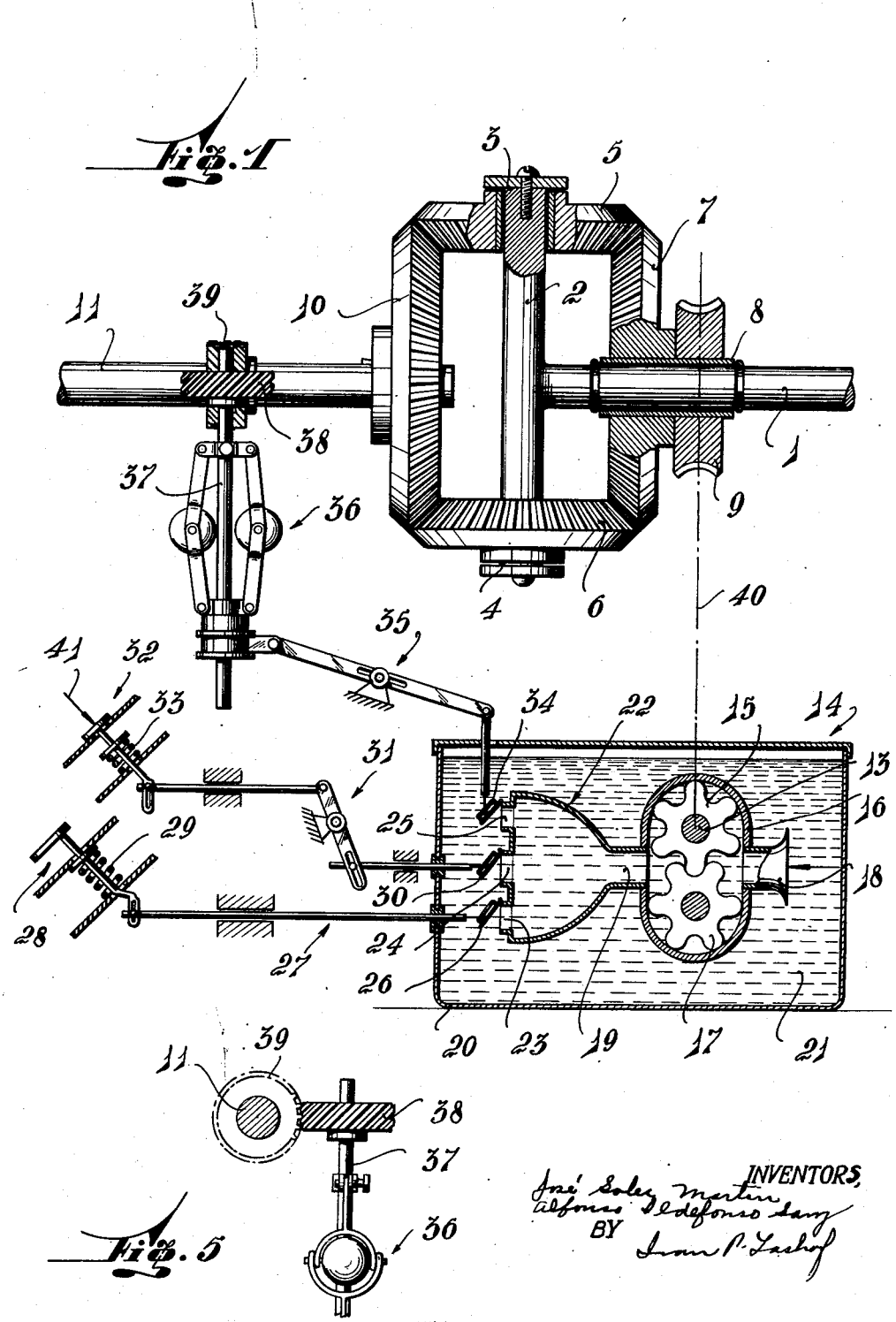

Sept. 29, 1953   J. S. MARTIN ET AL   2,653,487
ADJUSTABLE SPEED MECHANISM
Filed Oct. 2, 1950   2 Sheets-Sheet 2
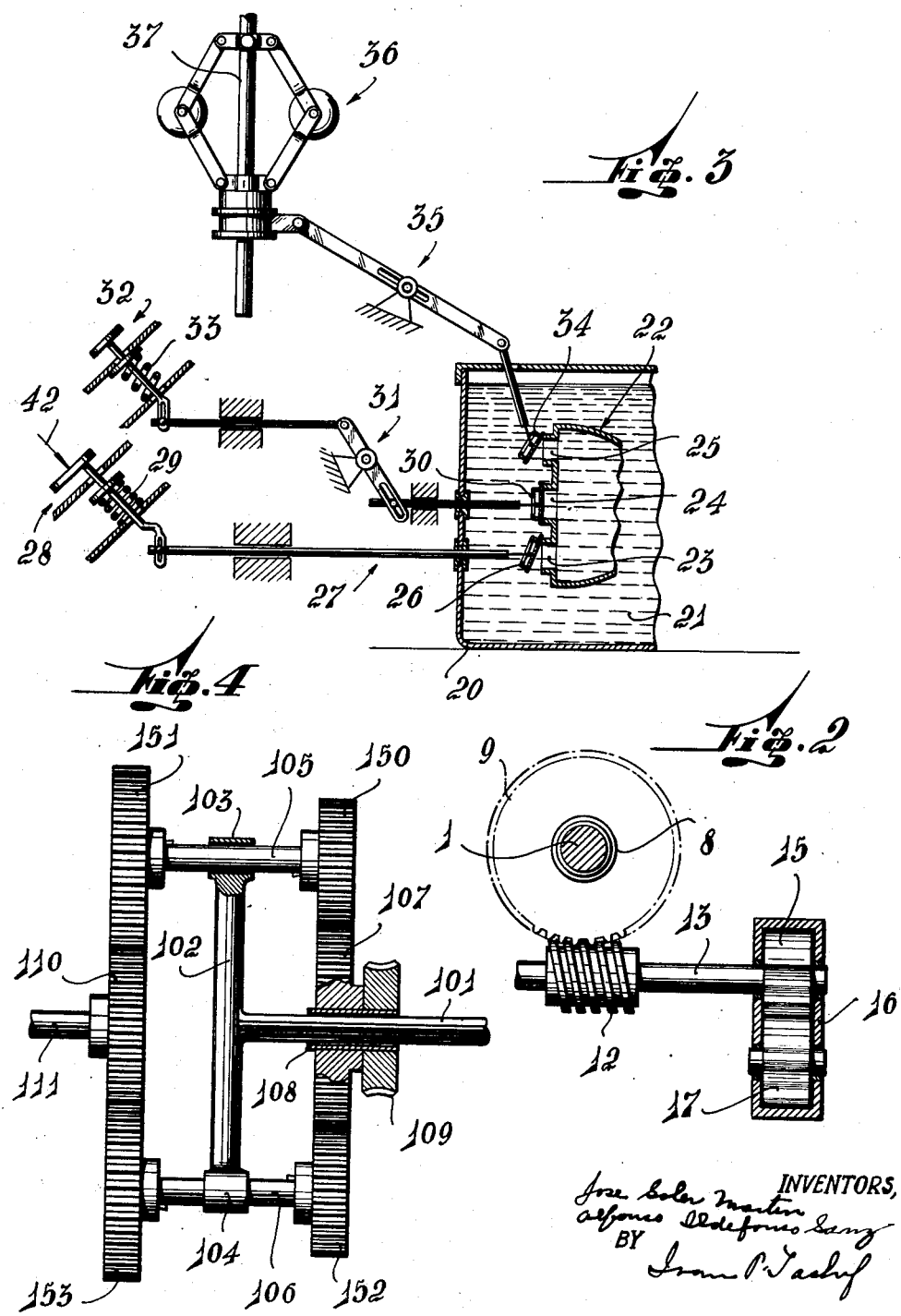

Patented Sept. 29, 1953

2,653,487

UNITED STATES PATENT OFFICE 2,653,487

ADJUSTABLE SPEED MECHANISM

José Soler Martín and Alfonso Ildefonso Sanz, Buenos Aires, Argentina

Application October 2, 1950, Serial No. 187,874
In Spain October 8, 1949

4 Claims. (Cl. 74—472)

This invention relates to an adjustable speed mechanism for transforming the number of revolutions of a driving shaft into any number of revolutions, within a given range, of a driven shaft, and more particularly the adjustable speed mechnasm is preferably applied to motor-cars where it supplants the known gear-boxes, clutches and mechanisms related therewith.

In motor-cars as well as in many other engines the speed and power of a driving shaft are controlled through a gear box or a hydraulic system which operatively relates said driven shaft with the driving shaft of the engine. The mechanical gear box, as is well known, only allows the relationship between power and speed to be changed in a limited way usually by means of three or four different ratios.

The hydraulic system has overcome this drawback, but requires the combination of a plurality of complicted means, so that in practice, it is too expensive and further requires very skilled mechanics to maintain the system in perfect condition.

The present invention combines the advantages of both systems and eliminates at the same time the respective drawbacks. In other words, the adjustable speed mechanism of this invention, is as simple as the above referred to mechanical gear box as far as its construction is concerned, and at the same time enables all the desired relationships between power and speed within a given ratio to be obtained as is nowadays possible only with a hydraulic system.

The adjustable speed mechanism comprises a driving shaft coupled at one end to an engine shaft and rotatably supporting at the other end at least one gear the axis of rotation of which is substantially perpendicular to the axis of said driving shaft, a first pinion and a second pinion substantially parallelly spaced from each other and having coaxial axes of rotation, said first pinion being controlled by a brake, said second pinion being coupled to a driven shaft, said gear meshing simultaneously with said first and second pinions.

From the foregoing it is apparent that an object of the present invention is to provide an adjustable speed mechanism for transforming the number of revolutions of a driving shaft into any number of revolutions, within a given range, of a driven shaft, without requiring the combination of a great number of means.

A further object is to provide an adjustable speed mechanism capable of transforming a given number of revolutions into any other number of revolutions by means of a gear system.

A still further object is to provide a mechanism of the type indicated which is easy to make and does not require, for its production, any special type of machine or tool out of the range of those commonly used.

These and further advantages and objects of this invention will become apparent in the course of the following description taken in connection with the accompanying drawings illustrating by way of example an adjustable speed mechanism in two embodiments.

In the drawings:

Fig. 1 is a part-sectional schematic elevation of an adjustable speed mechanism, in accordance with the present invention.

Fig. 2 is a side elevation showing the structural connection between the hydraulic brake arrangement and the gear arrangement.

Fig. 3 is a detail of Fig. 1 showing the valve arrangement of the hydraulic brake arrangement in a different position.

Fig. 4 is another embodiment of the gear transmitting mechanism.

Fig. 5 is an end view showing the connection between the governor and the driven shaft.

As can be seen in Fig. 1, one end of a driving shaft 1, the other end of which is adapted to be coupled, generally by means of a clutch (not shown), to the power take-off of an engine (not shown), forms a T piece 2 having free ends 3 and 4 on which respective gears 5 and 6 are freely mounted.

A first pinion 7 is fixedly mounted on a sleeve 8, which sleeve also supports a worm wheel 9. The sleeve 8 is freely mounted on shaft 1. Said first pinion 7 meshes with gears 5 and 6.

A second pinion 10 substantially parallelly spaced from said first pinion 7 and having the same diameter and number of teeth, also meshes with said gears 5 and 6, said second pinion 10 being fast on one end of a driven shaft 11.

As can be seen in Fig. 2, worm wheel 9 meshes with worm 12 mounted on shaft 13, said shaft 13 extending into a hydraulic brake arrangement 14 and supporting a gear 15 arranged within a gear pump box 16. Said gear pump box 16 further comprises a second gear 17 meshing with gear 15. An inlet 18 and an outlet 19 constitute the admission and discharge respectively of said pump which is arranged within a tank 20 containing a suitable fluid 21. Outlet 19 comprises a valve box arrangement 22 having valves 23, 24 and 25. Valve 23 comprises a closure member 26 connected through lever 27 to the spring urged accelerator member 28 so that spring 29 normally maintains open closure member 26 of valve 23.

Valve 24 comprises a closure member 30 connected through lever arrangement 31 to spring urged brake 32. Spring 33, as can be seen in Fig. 3 normally maintains closure member 30 in closed position with regard to valve 24.

Finally valve 25 comprises a closure member 34 connected through lever arrangement 35 to a governor 36, which when it is in inoperative position, as shown in Fig. 1, maintains closure member 34 in open position. Shaft 37 of governor 36 is provided at its upper free end with gear 38 of the inclined teeth type which meshes with a similar gear 39 mounted on driven shaft 11.

For convenience of the drawing, in Fig. 1, the structural relationship between gear 9 and shaft 13 is only schematically indicated by a dash and dotted line 40.

Although during the explanation of the mechanism of this invention, reference is preferably made to accessories as used in a motor car, it is to be understood that this is merely by way of example, and no limitation as to the application of the mechanism of this invention is thereby implicated.

The transmission of the movement produced by the driving shaft 1 through the mechanism described, to the driven shaft 11 has an upper limit and a lower limit. By "upper limit" is to be understood that the number of revolutions of the driving shaft is completely or totally transmitted to the driven shaft 11. By "lower limit" is to be understood that the number of revolutions of the driving shaft 1 is not transmitted at all to the driven shaft 11. As will be later on explained, by means of the hydraulic brake arrangement 14, any number of revolutions within the range of the upper and lower limits can be transmitted from the driving shaft 1 to the driven shaft 11. If pinions 7 and 10 are replaced by a pair of pinions the number of teeth of which is not equal, then, it is even possible to transmit a higher number of revolutions to the driven shaft than the driving shaft supplies.

In the arrangement described the upper limit is obtained by maintaining pinion 7 in a stationary position. Obviously if pinion 7 cannot rotate, the movement imparted to driving shaft 1 and thereby to shaft 2, produces a rotation of gears 5 and 6, which gears transmit their respective movements to the second pinion 10 and driven shaft 11 and thereby the desired upper limit is reached.

On the contrary if the lower limit is to be obtained, that is, that the driving shaft 1 does not transmit its movement to the driven shaft 11, pinion 7 should be released so that it may freely rotate with its sleeve 8 about shaft 1. Since the driven shaft 11 is supposed coupled to some other part or machine to be driven, its static resistance is higher than that of the first pinion 7, provided that the brake arrangement 14 is out of braking action and thereby, upon rotating driving shaft 1, gears 5 and 6 transmit the movement to pinion 7, whilst the second pinion 10 acts in a similar way as the first pinion 7 did when the upper limit was desired to be obtained.

It is obvious that by varying the action of the hydraulic brake arrangement 14 so that the first pinion 7 may rotate, but not to its fullest extent, any number of revolutions within the upper and lower limits may be transmitted from the driving shaft 1 to the driven shaft 11.

If it is desired to provide a mechanism with which it is even possible to obtain a higher number of revolutions in the driven shaft than that provided by the driving shaft, an arrangement such as shown in Fig. 4 should be used, wherein a driving shaft 101 is provided with a T piece 102 supporting at its free ends 103 and 104, shafts 105 and 106, respectively. A sleeve 108 is freely mounted on driving shaft 101 and is provided with a first pinion 107 and a worm wheel 109 which worm wheel 109 corresponds to worm wheel 9 in the other embodiment and is coupled in a similar way to the hydraulic brake arrangement 14 which will therefore not be described. A driven shaft 111 is provided at one end with a second pinion 110 which is of smaller diameter and has a smaller number of teeth than the first pinion 107. Shaft 105 and shaft 106 respectively, support gears 150, 151 and 152, 153, which gears mesh with the first and second pinions 107 and 110, respectively. In view of the fact that the first pinion 107 is of larger diameter and therefore has a greater number of teeth than the second pinion 110, the number of revolutions transmitted from driving shaft 101 through shaft 102 to shafts 105 and 106 increases the number of revolutions of driven shaft 111 because gears 150 and 152 transmit their movement to gears 151 and 153 which latter are of larger diameter than gears 150 and 152.

If the adjustable speed mechanism is connected to a hydraulic brake arrangement such as described in connection with Fig. 1 wherein an hydraulic brake arrangement forms part of a motor car, then the specific operation is as follows:

If the engine as well as the car itself stands still with the brake applied as indicated by arrow 41 in Fig. 1, then the closure member 30 of valve 24 is open. Similarly closure members 26 and 34 of valves 23 and 25, respectively, are open because no action is performed on accelerator member 28 and, governor 36 connected to driven shaft 11 is in its inoperative position because the driven shaft is not rotating. Upon starting the engine and thereby rotating shaft 1 the movement is transmitted through gears 5 and 6 to the first pinion 7 which loosely rotates about shaft 1 and is connected through gear 9 to worm wheel 12, which through shaft 13 operates gears 15 and 17 which absorb through inlet 18, fluid 21 and discharge said fluid through outlet 19 and valves 23, 24 and 25 back to tank 20. In view of the fact that the hydraulic brake arrangement 14 works without any substantial resistance, because the three valves are opened the total movement or power forwarded by the driving shaft 1 is absorbed by the first pinion 7 so that no movement is transmitted to the second pinion 10 and thereby to the driven shaft 11. Upon releasing brake 32, spring 33 closes valve 24 by means of lever arrangement 31 and closure member 30, so that the hydraulic brake system already starts to work with a certain load because the volume of fluid absorbed by gears 15 and 17 must be discharged through valves 23 and 25. Theoretically in view of the resistance produced by closure of valve 24 the first pinion 7, does already move with a certain load and therefore part of the movement and power forwarded by driving shaft 1 is transmitted to driven shaft 11. However in practice, it depends whether the resistance produced on the gears 15 and 17, in view of the closure of valve 24, is higher or lower than the static resistance existing in the driven shaft arrangement, to determine whether the driven shaft will already start its rotation. It is therefore a question to be decided according to what is desired, whether the driven shaft should move upon releasing brake 32, and it is advisable to give the section of valve 24 such a small dimension that the driven shaft will not move so as to avoid that upon accidental failure of the brake the motor-car will move.

Upon actuating accelerator member 28 as indicated by arrow 42 in Fig. 3 the closure member 26 is partially closed in accordance with the displacement of accelerator 28 and thereby the braking effect on the first pinion 7 increases to such an extent that part of the movement of the driving shaft 1 is transmitted to the driven shaft 11. At the same time, the driven shaft 11 actuates governor 36 through gears 39 and 38 and thereby closure member 31 initiates its restricting action on valve 25.

From the foregoing it is apparent to anybody skilled in the art, that the motor-car will initiate its movement in a smooth and steadily increasing way.

If the driver, upon initiating the displacement of the car, suddenly presses the accelerator down to its fullest extent, the car will not suddenly increase its speed to its upper limit, because valve 25 is maintained opened in view of the fact that it is controlled by the governor which operates in connection with the driven shaft. The maximum speed will only be reached when the governor has closed valve 25. The governor 36 must therefore be so calibrated that it closes valve 25 only when the engine forwards the highest speed in regular form.

If the car is running at any speed, upon releasing the accelerator member to its total extent and thereby opening valve 23 the car will only decelerate slowly because valve 24 corresponding to the brake is still closed and valve 25 corresponding to the governor is controlled by the vehicle's speed. However upon applying the brake 32 and thereby opening valve 24, for instance in an emergency case, the car will immediately decelerate to its maximum permissible extent, but it will avoid, in view of the governor 36 that the brake action is too high so that for instance the kinetic energy stored in the driver would produce his undue displacement with regard to his location.

It is obvious that it is not necessary to arrange the gear pump box 16 within the tank 20 if it is desired to reduce the space required for the hydraulic brake arrangement. If so, the inlet of the gear box pump 16 as well as the valves 23 to 25, should be connected to a smaller tank.

If the adjustable speed mechanism should be applied to other apparatus, then the number of valves may be increased or decreased in accordance with the requirements. When one valve is partially closed, the other valves do not have sufficent capacity to bleed off the full output of the pump.

We claim:

1. An adjustable speed mechanism for motorcars comprising a driving shaft connected to the engine and a driven shaft connected to the wheels of the motor-car, said driving shaft forming at its end opposite to the connection of the engine a T piece having two free ends on which are freely mounted corresponding gears meshing with a first and a second pinion substantially parallelly spaced from each other and having coaxial axes of rotation, said first and second pinions having the same diameter and number of teeth, said first pinion being mounted on a sleeve freely mounted on said driving shaft, a worm wheel also mounted on said sleeve and integral with said first pinion, said worm wheel meshing with a worm coupled to a gear pump arranged in a tank with fluid, said gear pump having an inlet and an outlet arranged within said tank, said outlet being connected to a valve arrangement consisting of three valves having respective closure members, one of said closure members being connected to an accelerator member of the motor-car, said accelerator member maintaining said closure member in open position when the accelerator member is in its inoperative position, the closure member corresponding to the second valve being connected to a brake of the motor-car, said brake maintaining said closure member in closed position when the brake is in its inoperative position, said second pinion being coupled to said driven shaft, a speed governor having a shaft of rotation coupled to said driven shaft, the closure member corresponding to the third valve being connected to said governor, said governor maintaining said closure member in open position when the governor is in its inoperative position.

2. An adjustable speed mechanism comprising a driving shaft and a driven shaft, said driving shaft being coupled at one end to an engine shaft and rotatably supporting at the other end a gear connection, a first pinion and a second pinion substantially parallel spaced from each other and having coaxial axes of rotation, a sleeve freely mounted on said driving shaft, said first pinion being integral with said sleeve, a worm wheel also integral with said sleeve, a worm, a pump in driving relationship with said worm, said worm wheel meshing with said worm, an inlet and an outlet for said pump, a tank with fluid, a valve box arrangement, said outlet being connected to said valve box arrangement having at least a first valve, a second valve and a third valve with respective first, second and third closure members, said first, second and third valves being connected to said tank, means for voluntarily actuating said first and second closure members in inverse proportional functional relationship, so that by actuating said first closure member the latter closes said first valve, while by actuating said second closure member the latter opens said second valve, a speed governor having a shaft of rotation coupled to said driven shaft, said third closure member being connected to said speed governor, said second pinion being integral with said driven shaft, said gear connection connecting said first and second pinions.

3. An adjustable speed mechanism comprising a driving shaft and a driven shaft, said driving shaft being coupled at one end to an engine shaft and being integral at the other end with a T-piece having a gear connection, a first pinion and a second pinion substantially parallel spaced from each other and having coaxial axes of rotation, said first pinion being freely mounted on said driving shaft and integral with a gear, a pump in driving relationship with said gear, an inlet and an outlet for said pump, a tank with fluid, a valve box arrangement, said outlet being connected to said valve box arrangement having at least a first valve, a second valve and a third valve with respective first, second and third closure members, said first, second and third valves being connected to said tank, means for voluntarily actuating said first and second closure members in inverse proportional functional relationship, so that by actuating said first closure member the latter closes said first valve, while by actuating said second closure member the latter opens said second valve, a speed governor having a shaft of rotation coupled to said driven shaft, said third closure member being connected to said speed governor, said second pinion being integral with said driven shaft, said gear connection connecting said first and second pinions.

4. An adjustable speed mechanism comprising a driving shaft and a driven shaft, said driving shaft being coupled at one end to an engine shaft and being integral at the other end with a T-piece having two free ends each rotatably supporting at least one gear, a first pinion and a second pinion meshing with said gear, a worm wheel integral with said first pinion, a worm, a pump in driving relationship with said worm, said worm wheel meshing with said worm, a tank with fluid, said pump being housed in said tank and having an inlet and an outlet, said inlet being in said tank, said outlet being connected to a valve box arrangement also in said tank and having at least a first valve, a second valve and a third valve, said first, second and third valves being provided with respective first, second and third closure members, a first lever connected to said first closure member and having a spring urged actuating member capable of maintaining said first closure member in open position, a second lever connected to said second closure member and having a spring urged actuating member capable of maintaining said second closure member in closed position, a speed governor having a shaft of rotation coupled to said driven shaft, a third lever coupled to said third closure member and to said speed governor and capable of maintaining said third closure member in open position when said speed governor is in inoperative position.

JOSÉ SOLER MARTÍN.
ALFONSO ILDEFONSO SANZ.

References Cited in the file of this patent

UNITED STATES PATENTS

| Number | Name | Date |
| --- | --- | --- |
| 1,542,701 | Joyner | June 16, 1925 |
| 1,957,578 | Cook | May 8, 1934 |
| 2,051,187 | Strigl | Aug. 18, 1936 |
| 2,263,707 | Strigl | Nov. 25, 1941 |
| 2,278,351 | Havens | Mar. 31, 1942 |
| 2,373,138 | Morith | Apr. 10, 1945 |
| 2,533,126 | Looney | Dec. 5, 1950 |
| 2,580,449 | Maat | Jan. 1, 1952 |

FOREIGN PATENTS

| Number | Country | Date |
| --- | --- | --- |
| 12,209 | France | Aug. 9, 1910 |
| 305,016 | Italy | Jan. 24, 1933 |
| 372,011 | France | Feb. 7, 1907 |